March 25, 1969           W. SHAW           3,434,666

THRUST REVERSER FOR A JET PROPULSION ENGINE

Filed Feb. 24, 1966

INVENTOR
William Shaw
BY
Cushman, Darby & Cushman
ATTORNEYS

March 25, 1969  W. SHAW  3,434,666
THRUST REVERSER FOR A JET PROPULSION ENGINE
Filed Feb. 24, 1966 Sheet 2 of 2

INVENTOR
William Shaw
BY Cushman, Darby & Cushman
ATTORNEY

United States Patent Office 3,434,666
Patented Mar. 25, 1969

3,434,666
THRUST REVERSER FOR A JET
PROPULSION ENGINE
William Shaw, Alvaston, Derby, England, assignor to Rolls-Royce Limited, Derby, England, a British company
Filed Feb. 24, 1966, Ser. No. 529,848
Claims priority, application Great Britain, Mar. 17, 1965, 11,427/65
Int. Cl. A01g 25/02; B05b 1/20
U.S. Cl. 239—265.19
10 Claims

ABSTRACT OF THE DISCLOSURE

A thrust reverser for a jet propulsion engine comprises an exhaust duct, two members of aerofoil-section, movably mounted completely within the exhaust duct. Means are provided for moving the aerofoil-section members between an inoperative position in which they are disposed completely within and streamline to the flow path of jet gases but are out of contact with each other and, thus, do not substantially impede the flow of jet gases passing downstream through the exhaust duct, and an operative position in which they contact each other and deflect at least part of the jet gases forwardly.

---

This invention concerns a thrust reverser for a jet propulsion engine.

According to the present invention, there is provided a thrust reverser for a jet propulsion engine comprising an exhaust duct, two members of aerofoil-section which are mounted completely within and spaced from said exhaust duct and which are movable therein, and means for moving the aerofoil-section members between an inoperative position within the exhaust duct in which inoperative position, the aerofoil-section members are disposed streamline to the exhaust gases and substantially parallel to the exhaust duct and are out of contact with each other and do not substantially impede a flow of jet gases passing downstream through the exhaust duct, and an operative position within the exhaust duct in which operative position the aerofoil-section members contact each other and deflect at least part of the jet gases forwardly.

The exhaust duct is preferably provided with at least one closure member which is connected to said aerofoil-section members so that the or each closure member is opened and closed when the aerofoil-section members are respectively in their operative and inoperative positions, the or each closure member when open permitting the deflected jet gases to pass out of the exhaust duct in a non-axial forward direction.

In one embodiment of the present invention, the closure member is movable so as to close and open at least one aperture in the exhaust duct. In this case each aerofoil-section member may be mounted on a pivot which is carried by the axially movable closure member, each aerofoil-section member being connected to the exhaust duct by a linkage which causes the respective aerofoil-section member to rotate on its pivot as the closure member is moved axially.

In another embodiment of the present invention, each aerofoil-section member and its respective closure member are mounted on a common pivot.

The or each closure member, when open, may be arranged to deflect part of the jet gases. Thus, the exhaust duct may be mounted within a by-pass duct, the or each said closure member, when open, deflecting at least part of any by-pass air flowing through the by-pass duct. In this case, the by-pass duct may be provided with at least one closure device which is arranged to be opened and closed in unison with a said closure member, the or each closure device when open permitting the deflected by-pass air to pass out of the by-pass duct in a non-axial forward direction.

The or each said closure device may be connected by a linkage to the said common pivot so that rotation of the latter effects movement of the closure device.

Preferably the aerofoil-section members, when in the operative position, deflect only part of the jet gases.

The invention also comprises a jet propulsion engine provided with a thrust reverser as set forth above.

Figure 1:
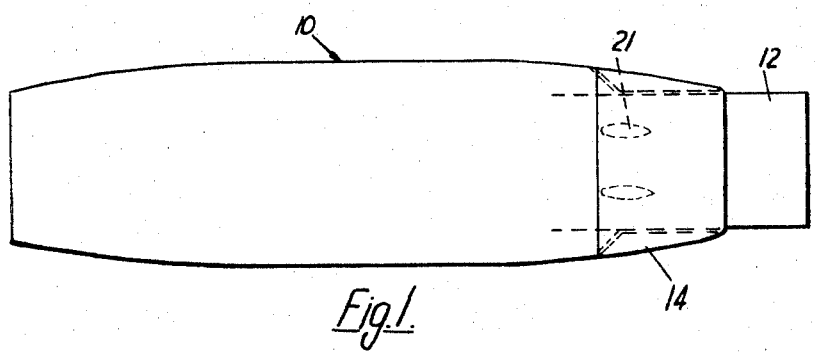
Figure 2:
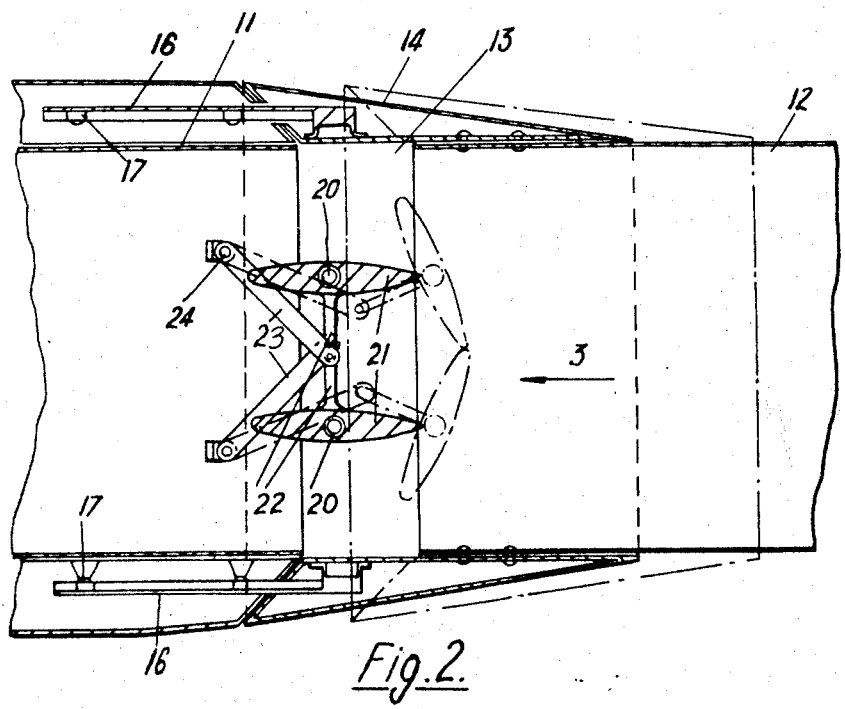
Figure 3:
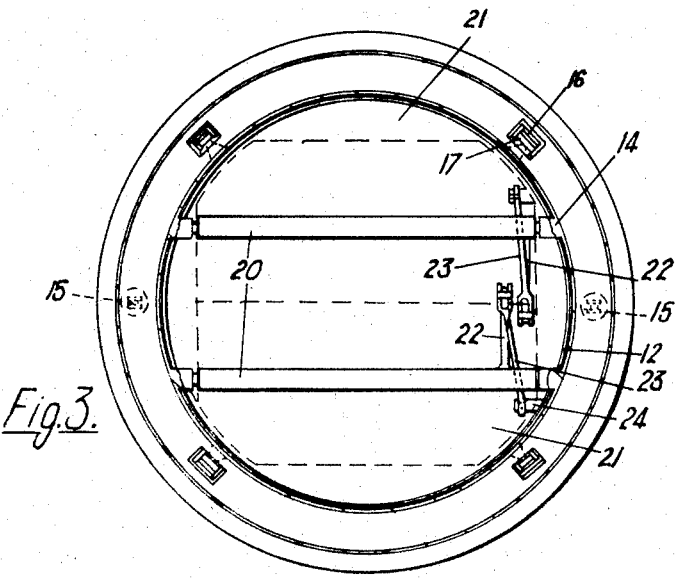
Figure 4:
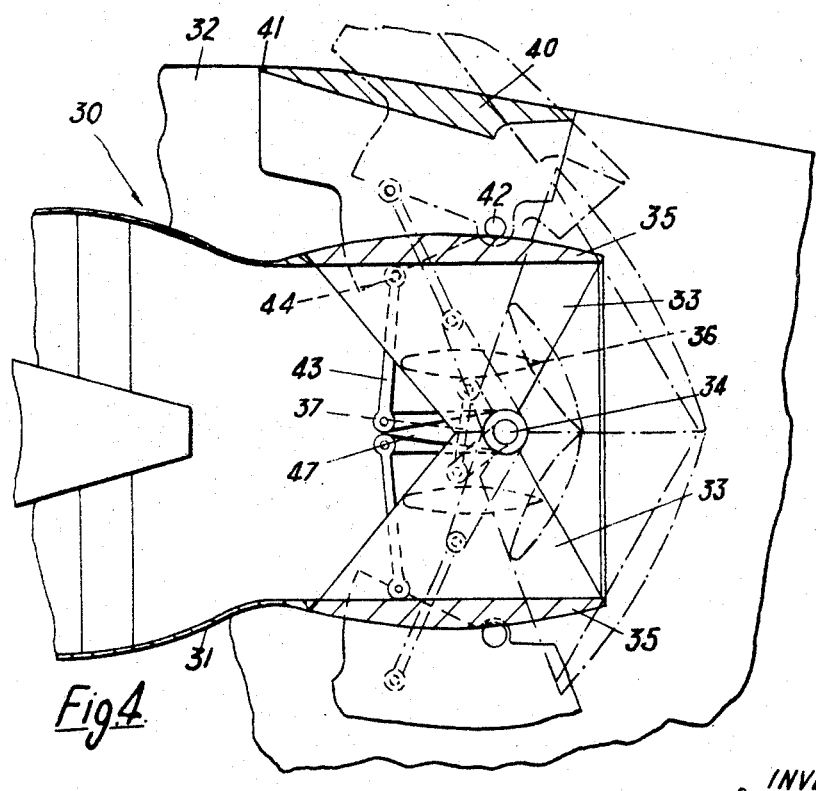

The invention is illustrated, merely by way of example, in the accompanying drawings, in which:

FIGURE 1 is a diagrammatic view of a gas turbine jet propulsion engine provided with a thrust reverser according to the present invention, FIGURE 2 is a broken-away sectional view on a larger larger scale of the thrust reverser shown in FIGURE 1, FIGURE 3 is a cross sectional view looking in the direction of the arrow 3 of FIGURE 2, and FIGURE 4 is a broken-away sectional view illustrating another thrust reverser according to the present invention.

Referring first to the embodiment shown in FIGURES 1–3, a gas turbine jet propulsion engine 10 has an exhaust duct which is formed in two axially spaced parts 11, 12 which are separated by a gap 13. Mounted upon and secured to the part 12 is a closure sleeve 14 which is axially movable between an open position, indicated by chain dotted lines, in which jet flow may occur through the gap 13, and a closed position, indicated by full lines, in which such jet flow is prevented.

The closure sleeve 14 is moved between the open and closed positions by two diametrically oppositely disposed rams 15 (FIG. 3), the closure sleeve 14 having secured thereto guide rails 16 which slidably engage rollers 17 carried by the part 11, whereby to prevent rotation of the closure sleeve 14 during axial movement thereof.

The closure sleeve 14 is provided with two spaced pivots 20 on each of which there is mounted an aerofoil-section member 21. Each of the aerofoil-section members 21 is rigidly connected to an arm 22, the arm 22 being pivoted to one end of a link 23 whose opposite end is pivotally connected to a fixed pivot 24 carried by the part 11.

The linkages provided by the links 23 and arms 22 are such that, when the closure sleeve 14 is in its closed position, the aerofoil-section members 21 are disposed in an inoperative position (shown in full lines). In the said inoperative position the aerofoil-section members 21, although they are disposed within the flow of jet gases passing downstream through the exhaust duct 11, 12, are out of contact with each other and do not substantially impede this flow.

When, however, the closure sleeve 14 has been moved downstream into its open position, the linkages provided by the parts 22, 23 cause the aerofoil-section members 21 to rotate on their pivots 20 so that the aerofoil-section members 21 become moved into an operative position (shown in chain dotted lines) in which they contact each other and deflect a part, but not the whole, of the said jet gases. These deflected jet gases pass out of the exhaust duct 11, 12 in a non-axial forward direction through the gap 13, the aerofoil-section members 21 acting as a thrust reverser.

In the embodiment of the invention shown in FIGURE 4, a gas turbine jet propulsion engine 30 of the by-pass type, has an exhaust duct 31 which is mounted within a by-pass duct 32. Mounted at the downstream end of the exhaust duct 31 are a pair of clam shell members 33 which are mounted on a common pivot 34 carried by the by-pass duct 32.

Means (not shown) are provided for rotating the common pivot 34.

Each clam shell member 33 has a part cylindrical outer wall 35 which is adapted to form a smooth continuation of the remainder of the exhaust duct 31. Each clam shell member 33 is moreover provided with an aerofoil-section member 36.

Each clam shell member 33 is connected to the common pivot 34 by a linkage 37 (only one of which is shown in FIGURE 4), whereby rotation of the common pivot 34 effects movement of the clam shell members 33 between the position shown in full lines and the position shown in chain dotted lines.

In the full line position, the outer walls 35 of the clam shell members 33 will form closure members preventing jet gases from flowing otherwise than in an axial direction through the exhaust duct 31. In this position, moreover, the aerofoil-section members 36 will be disposed within, but will be out of contact with each other and will not substantially impede, the said flow of jet gases.

In the chain dotted line position, however, a part, but not the whole, of the jet gases flowing through the exhaust duct 31 will be deflected forwardly by the aerofoil-section members 36 which contact each other at this time, while the remainder of these jet gases will be deflected forwardly by the outer walls 35. These outer walls 35, when open, moreover, forwardly deflect a part, but not the whole, of the by-pass air flowing through the by-pass duct 32.

The by-pass duct 32 is provided with a closure device including two closure doors 40 for the closure of apertures 41 in the by-pass duct. Each of the closure doors 40 is mounted on a pivot 42 carried by the by-pass duct 32. One end of a link 43 is pivotally connected at 44 to a point on the respective closure door 40 remote from the pivot 42. The opposite end of the link 43 is pivotally connected to an arm 45 mounted on the common pivot 34. Accordingly, rotation of the common pivot 34 effects movement of the doors 40 between their full line, or closed position, and their dotted line or open position. The closure doors 40 when open, permit the by-pass air which has been deflected by the outer walls 35 to pass out of the by-pass duct 32 in a non-axial forward direction.

I claim:
1. A thrust reverser for a jet propulsion engine comprising an exhaust duct for jet gases, two members of aerofoil section which are centrally mounted completely within the exhaust duct, means for moving the aerofoil section members between (a) an inoperative position in which the aerofoil section members are disposed substantially parallel to the exhaust duct in spaced positions from the exhaust duct and from the central longitudinal axis of the exhaust duct so that said aerofoil section members are streamlines to the flow of jet gases in the exhaust duct and do not substantially impede the flow of jet gases passing downstream through the exhaust duct, and (b) an operative position within the exhaust duct in which the aerofoil section members contact each other and deflect at least part of the jet gases forwardly.

2. A thrust reverser as claimed in claim 1 in which the exhaust duct is provided with at least one closure member which is connected to said aerofoil-section members so that the closure member is opened and closed when the aerofoil-section members are respectively in their operative and inoperative positions, the closure member when open permitting the deflected jet gases to pass out of the exhaust duct in a non-axial forward direction.

3. A thrust reverser as claimed in claim 2 in which the closure member is axially movable so as to close and open at least one aperture in the exhaust duct.

4. A thrust reverser as claimed in claim 3 in which each aerofoil-section member is mounted on a pivot which is carried by the axially movable closure member, each aerofoil-section member being connected to the exhaust duct by a linkage which causes the respective aerofoil-section member to rotate on its pivot as the closure member is moved axially.

5. A thrust reverser as claimed in claim 2 in which each aerofoil-section member and its respective exhaust duct closure member are mounted on a common pivot.

6. A thrust receiver as claimed in claim 5 in which the closure member, when open, is arranged to deflect part of the jet gases.

7. A thrust reverser as claimed in claim 6 in which the exhaust duct is mounted within a by-pass duct, the said closure member, when open, deflecting at least part of any by-pass air flowing through the by-pass duct.

8. A thrust reverser as claimed in claim 7 in which the by-pass duct is provided with at least one closure device which is arranged to be opened and closed in unison with a said closure member, the closure device when open permitting the deflected by-pass air to pass out of the by-pass duct in a non-axial forward direction.

9. A thrust reverser as claimed in claim 8 in which the said closure device is connected by a linkage to the said common pivot so that rotation of the latter effects movement of the closure device.

10. A thrust reverser as claimed in claim 1 in which the aerofoil-section members, when in the operative position, are spaced from the exhaust duct by a distance substantially equal to half their length and deflect only part of the jet gases.

References Cited

UNITED STATES PATENTS

| | | | |
|---|---|---|---|
| 2,943,444 | 7/1960 | Baxter | 239—265.33 X |
| 2,943,443 | 7/1960 | Voymas et al. | 60—230 |
| 2,979,893 | 4/1961 | Meyer | 239—265.29 |
| 3,164,956 | 1/1965 | Colebrook et al. | 239—265.37 |
| 3,172,256 | 3/1965 | Kerry et al. | 60—229 |
| 3,266,734 | 8/1966 | Gahagan et al. | 60—230 X |

M. HENSON WOOD, JR., *Primary Examiner.*

H. NATTER, *Assistant Examiner.*

U.S. Cl. X.R.

239—265.31, 265.33, 265.37